Patented June 24, 1924.

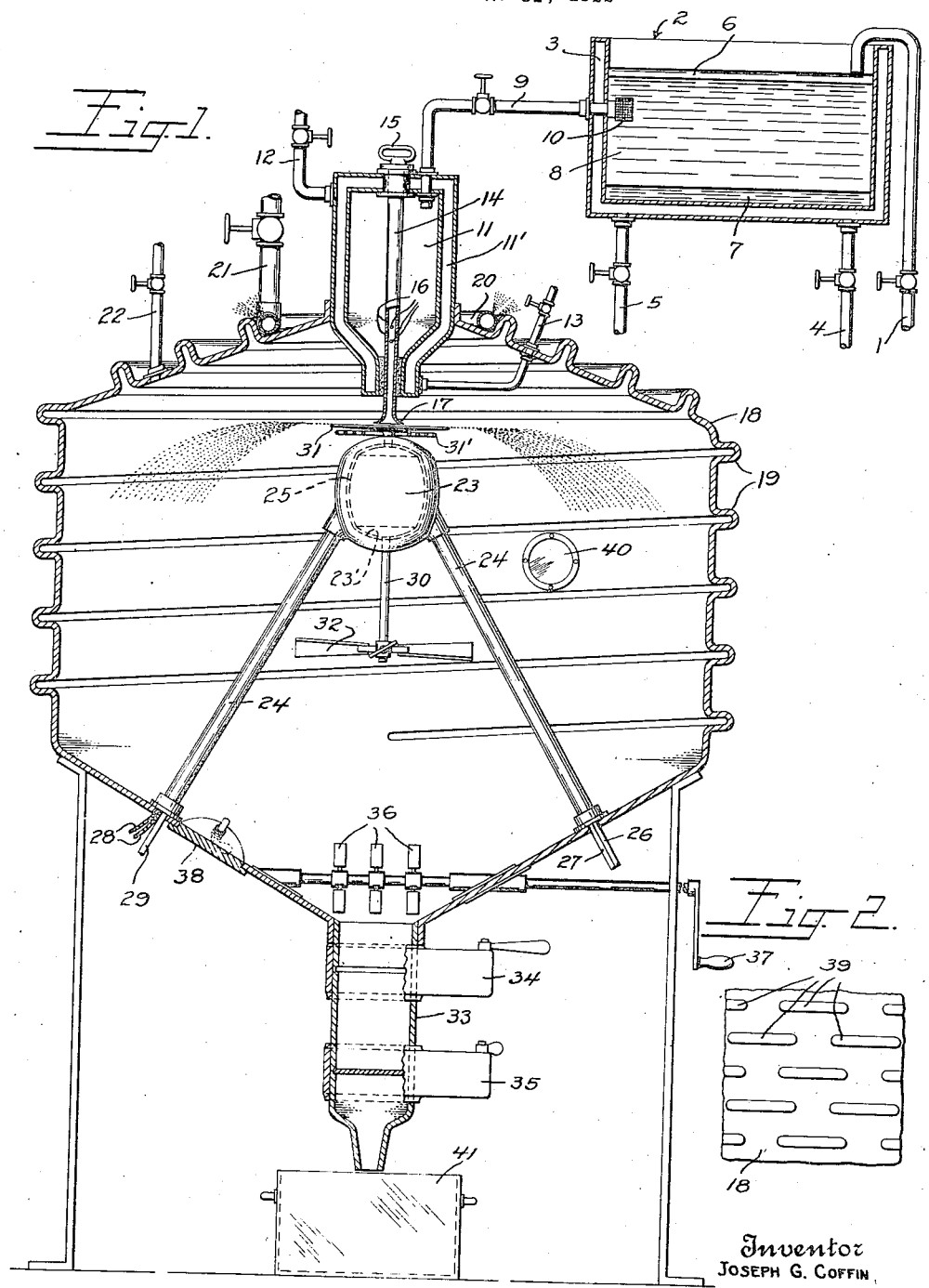

1,498,717

UNITED STATES PATENT OFFICE.

JOSEPH G. COFFIN, OF HEMPSTEAD, NEW YORK, ASSIGNOR TO THE NAUGATUCK CHEMICAL COMPANY, A CORPORATION OF CONNECTICUT.

METHOD AND APPARATUS FOR UNIFORMLY FINELY DIVIDING SULPHUR.

Application filed August 31, 1922. Serial No. 585,346.

*To all whom it may concern:*

Be it known that I, JOSEPH G. COFFIN, a citizen of the United States, residing at Hempstead, Long Island, county of Nassau, State of New York, have invented a certain new and useful Method and Apparatus for Uniformly Finely Dividing Sulphur, of which the following is a full, clear, and exact description.

This invention relates to a method and apparatus for uniformly finely dividing sulphur, more particularly to a method and apparatus for finely dividing it while in a molten condition.

For many years the world's sulphur supply was largely obtained from the craters of volcanoes, the sulphur in solid condition being dug out of deposits in the craters. In recent years the supply has been greatly increased by obtaining it from deposits deep in the earth by the well-know "Frasch" process. In using this process a well is driven into the deposit of sulphur, the latter liquefied by forcing superheated water down into the deposit, and the molten sulphur then forced up to the surface and disposed of in any suitable manner, the usual procedure being to allow it to solidify in storage bins from which it is afterwards necessary to obtain the sulphur for shipment by breaking it up. Finely divided sulphur is largely used in the arts, and an important use is in the vulcanizing of rubber. The usual methods of obtaining the sulphur in finely divided form are by sublimation or by grinding the solid material. Both of these methods are relatively expensive and the grinding process involves considerable risk of fire or explosion due to the nature of the material. For use in vulcanizing rubber the sulphur must be in a pure condition and in a uniformly finely divided form, as the sulphur is ordinarily incorporated into the rubber along with any other desired compounding ingredients by mixing on a mill, and in order to secure uniform vulcanization the sulphur must not only be uniformly mixed in the rubber, but the particles must be small and of relatively uniform size. Owing to the above described expensive processes for obtaining pure sulphur in a uniformly finely divided condition, the cost of the sulphur as laid down at the rubber mill is vastly increased over the price of crude sulphur as obtained from the deposit. It has been proposed to finely divide sulphur by spraying it in a molten condition with compressed air or steam. However, as is well known, when any liquid is sprayed by the usual compressed air or steam jet the particles vary greatly in size, as it is impossible to secure a uniform action of the spraying medium upon the liquid. Hence, while sulphur obtaned by this method may be suitable for certain purposes, it cannot be successfully used in rubber compounds as a vulcanizing agent without being first ground, which, as before stated, adds greatly to the expense. It has also been proposed, as disclosed in the patent to Perry, No. 1,285,358, to centrifugally spray molten sulphur as obtained from the subterranean deposits by delivering it into a rotating container having perforated side walls, with the object of obtaining the sulphur in the form of small, shot-like bodies which may be readily handled for shipping purposes. However, sulphur obtained by this process is also open to the objection that it must be ground before use in mixing with rubber for vulcanizing.

An object of my invention is to provide an improved method and apparatus for uniformly finely dividing sulphur.

Another object is to provide a method and apparatus for directly and economically obtaining substantially pure uniformly finely divided sulphur from the crude molten sulphur.

Another object is to provide an improved centrifugal spraying apparatus for spraying sulphur.

For a detailed disclosure of the invention reference is had to the accompanying specification and drawing, in which latter:

Fig. 1 is a sectional, more or less diagrammatic, illustration of the apparatus used in carrying out the process; and Fig. 2 is a broken away detail illustration of a modified form of cooling device.

The invention will first be described with reference to a specific application thereof for obtaining substantially pure finely divided sulphur directly from the molten material as pumped from the subterranean deposits, but it will be obvious from the later description that the invention is not limited in its application to the subdivision of sulphur obtained in this particular manner.

Referring to Fig. 1 of the drawing there is shown a valved supply pipe 1 for conducting the molten sulphur as it is forced from the well, which sulphur is discharged into a settling tank 2, the latter being provided with a heating jacket 3 to which steam or other heating fluid may be admitted by the valved pipe 4, while the condensation may be discharged by means of a valved pipe 5. By allowing the crude material to settle in the tank while maintaining it in a molten condition, any impurities tend to separate from the sulphur, those portions which are lighter than the sulphur rising to the top as shown at 6, while the heavier impurities 7 settle to the bottom of the tank. A valved outlet pipe 9 is connected into the tank and opens into the intermediate layer 8 of relatively pure sulphur, the inlet to the pipe being covered by a screen or strainer 10.

The discharge pipe 9 leads into an auxiliary tank 11 provided with a heating jacket 11', to which latter is connected a steam pipe 12 and a condensation outlet 13. Slidably mounted in the top and bottom of the auxiliary tank 11 is a tubular discharge pipe 14, provided at its top with a handle 15 by which it may be adjusted, and having adjacent its lower portion openings 16 communicating with the interior of the tank. The lower end of the member 14 is provided with a discharge nozzle 17 of any suitable form such, for instance, as shown. The tank 11 is disposed with its lower end projecting through the top wall of a casing 18, which forms a sprayer chamber. The wall of the casing 18 on its exterior is provided with any suitable form of cooling rib or vane, such as the spirally arranged rib 19 shown in the drawing, and in order to assist the cooling action of the vane 19, a sprayer head 20 is provided on the top of the casing, which head communicates with a valved supply pipe 21 for water or other cooling medium. Leading into the casing at any suitable point is a valved supply pipe 22 for an inert gas, such as nitrogen or carbon dioxide. A motor housing 23, provided with a cooling jacket 23' is supported within the casing by means of a tripod 24, and within the jacket a suitable motor 25, which in the present instance may be an electric one, is disposed. The tripod 24 may be formed of tubular members through which the supply and exhaust pipes 26, 27, for the cooling jacket may extend, as well as the current wires 28 for the motor and a pipe 29. The pipe 29 may be used to force a gaseous fluid under pressure into the space within the cooling jacket around the motor, and this causes a pressure differential which aids in preventing any entrance of sulphur through the bearings of the motor shaft. It is obvious that any suitable motor and protection therefor may be used instead of the construction shown. Secured on the upper end of the motor shaft 30 is a sprayer disk 31, the center of rotation of which is in substantial alignment with the axis of the discharge nozzle 17, the latter being adjusted to closely approach the sprayer disk. Secured to the motor shaft, or elsewhere if desired, is any suitable form of fan 32 for circulating the gaseous medium within the casing 18 along the walls to thereby more efficiently cool said medium. In the present instance a single spraying unit is shown in the chamber, but in larger installations, any suitable number of such units may be employed. The casing 18 is provided with an inclined bottom leading to a discharge nozzle 33 governed by the gate valves 34 and 35, and above the nozzle a stirrer 36 is provided, which may be operated by the crank handle 37 to prevent packing of the material adjacent the nozzle. A man-hole 38 is also provided to allow access to the interior of the casing. If desired, any other suitable form of cooling vane may be substituted for the spiral vane 19, such as the series of staggered vanes 39 shown in Fig. 2. In order to view operations, one or more peep openings 40 may be disposed at any desired point in the casing 18.

In operation, the molten sulphur as received from the subterranean deposit is discharged from the pipe 1 into the heated tank 2 and the impurities allowed to separate by gravity. The purified sulphur from the intermediate stratum in the tank is then drawn out by the pipe 9 and emptied into the auxiliary tank 11 at the top of the sprayer casing 18. The disk sprayer 31 and fan 32 are started and the discharge nozzle 17 is properly adjusted to allow a thin film of sulphur to flow onto the center of the disk 31, which sulphur is then discharged in the form of a very thin film from the edge of the disk, which film breaks up into small and uniform size particles. In order to prevent any fire or explosion risk, it is preferable to have an atmosphere of an inert gas within the casing 18, and this gas may, if desired, be supplied through the pipe 22. However, instead of this, a small quantity of sulphur or other combustible may be placed in the casing before starting the sprayer and ignited to burn out the oxygen from the air in the casing, leaving only the nitrogen and sulphur dioxide. By the action of the fan, the gaseous medium in the casing is caused to circulate along the walls where it comes in contact also with the vanes 19 or 39, which latter and the outer wall are cooled by the water flowing down from the spray head 20. The finely divided sulphur collects at the bottom of the casing, where it may be periodically removed by first closing the valve 35 and then opening the valve 34 to allow a measured quantity to flow into the discharge nozzle 33 between the two valves. Valve 34 is then closed and valve 35 opened to allow the measured quantity to fall into the receptacle 41. Should the material tend to pack at the bottom of the casing, it may be stirred up by operating the crank handle 37.

To prevent caking or solidification of sulphur on the disk 31, particularly at the initiation of an operation or run, heating elements of any suitable kind, such as the steam coil 31', may be located immediately adjacent the disk. This steam coil may be connected up with an outside source of supply in any convenient manner, as by piping extending through the third leg, not shown, of the tripod 24, a valve being provided to regulate the supply of steam and the duration of its use. Of course, electrical elements may be utilized in lieu of the steam coil and wired up as convenient.

Should it be desired to spray sulphur which has already been purified and solidified, the latter may be melted and supplied direct to the auxiliary tank 11.

It will be seen that by my invention the sulphur may be finely divided and that, owing to the manner of spraying, the particles for any given speed and size of the sprayer disk will be of relatively uniform size. Hence, by the use of my process and apparatus, the crude sulphur as obtained in the molten form from the subterranean deposit may be directly and economically converted into a uniformly finely divided product capable of use without any further treatment in the vulcanization of rubber. Owing to its uniformly finely divided character, it is also capable of use for any other purpose in the arts requiring sulphur in this form. When a heating element, such as 31', is employed, and by suitable regulation thereof, the sulphur is divided more finely than when the disk is not heated, especially at the outset of a run.

While a specific embodiment of the invention has been shown and described, it is obvious that numerous modifications may be made therein without departing from the scope of the appended claims.

Having thus described my invention, what I claim and desire to protect by Letters Patent is:

1. The method of obtaining sulphur in a uniformly fine pulverulent form, which consists in centrifugally projecting molten sulphur in finely divided form into a closed chamber, and precipitating the sulphur therein in dry pulverulent form by cooling.

2. The method of obtaining sulphur in a uniformly fine pulverulent form, which consists in liquefying it, discharging the fluid material from a rapidly revolving flat disk to finely divide it, and converting it into a dry pulverulent form by cooling in the presence of an inert gas.

3. The method of obtaining sulphur in a uniformly fine pulverulent form, which consists in fusing the sulphur, delivering the fused sulphur centrally and smoothly onto a rapidly rotating disk, whereby it is discharged from the disk and broken up into uniformly fine particles, and solidifying the particles in dry pulverulent form by subjecting them to the cooling action of an inert gaseous medium.

4. The method of obtaining sulphur in a uniformly fine pulverulent form, which consists in fusing the sulphur, delivering the fused sulphur centrally and smoothly onto a rapidly rotating disk in a closed chamber, whereby it is discharged from the disk and broken up into uniformly fine particles, and solidifying the particles in dry pulverulent form by cooling them in the chamber while under suspension in a circulating body of an inert gaseous medium.

5. The method of obtaining sulphur in a uniformly fine pulverulent form which comprises projecting molten sulphur in finely divided form into a closed chamber, continuously circulating an inert gas therein, and continuously cooling said gas during a portion of its movement.

6. Apparatus for uniformly finely dividing sulphur comprising a casing forming a closed spraying chamber, a flat spraying disk mounted adjacent the upper end thereof, means for rotating said disk, means for centrally and smoothly delivering molten sulphur on said disk, means for circulating a gaseous medium in said chamber, and means for cooling said medium.

7. Apparatus for uniformly finely dividing sulphur comprising a casing forming a closed spraying chamber, a centrifugal sprayer disposed in the upper part thereof, adjustable means for centrally and smoothly delivering molten sulphur to said sprayer, means for circulating an inert gaseous medium in a direction opposite to the path taken by the sprayed particles, and exterior means for cooling the wall of said chamber.

8. Apparatus for uniformly finely dividing sulphur comprising a casing forming a closed spraying chamber, heat conducting means carried by the exterior of said casing, means for delivering a cooling fluid on said means, means for circulating a gaseous medium within said casing, a rotary spraying disc disposed in the upper part of said chamber, means adjustable to and from said disc for discharging molten sulphur thereon, and a valve controlled outlet from said chamber.

Signed at New York, in the county of New York, and State of New York, this 24 day of August, 1922.

JOSEPH G. COFFIN.